Patented Dec. 20, 1932

1,891,609

UNITED STATES PATENT OFFICE

ALFRED W. SCHEIDT, OF SEWAREN, NEW JERSEY, ASSIGNOR TO THE ELECTRIC SMELTING & ALUMINUM COMPANY, OF CLEVELAND, OHIO, A CORPORATION OF OHIO

PROCESS OF PRODUCING ALUMINA FROM WASTE COAL PRODUCTS

No Drawing. Application filed December 26, 1929, Serial No. 416,767. Renewed June 16, 1932.

This invention relates to the recovery of alumina from aluminous and silicious materials containing alumina, and more particularly to the recovery of alumina from powdered coal ashes, clinkers or ashes from the burning of coal, waste coal products, coal mine strippings, and the like.

An object of my invention is to recover the alumina from such aluminous materials by the production of sodium aluminate in the treatment of them with a calcium substance or compound and an alkali carbonate, such as soda ash, sintering the mixture and dissolving out the sodium aluminate, and finally obtaining the alumina from the sodium aluminate by well known means.

In carrying out my invention I am able to utilize the combination of waste products from different industries. For example, the aluminous material may be the ground ashes or clinkers obtained from burning coal in the generation of power, or other waste coal products, such as waste piles of coal mines. One excellent aluminous material is ashes from the burning of powdered coal.

In the generation of power, bituminous coal is frequently powdered and burned under boilers for steam generation. The coal used is in finely divided condition, and in burning produces a very hot flame, whereby the carbon of the coal is largely burned out, leaving the ash of the coal suspended in the moving gas stream causing the ash particles to become more or less globular in form, fused and semi-fused, and extremely finely divided. Samples taken and observed show that ninety-nine per cent passes through a one hundred mesh screen, and ninety per cent passes through a three hundred mesh screen.

The disposal of these ashes from the burning of powdered coal has introduced quite a problem in power generation in cities, for when it was discharged through the stacks of the power plants it gradually settled on the surrounding country, to the detriment of vegetation, buildings and the people in the neighborhood. Some plants, especially those of modern construction, have necessitated the removal of the powdered coal ash from their stack gases by various precipitating apparatus. The disposal of this precipitate has produced a further problem, and up to the present time its only use has been as a fill, but owing to its very fine form it is not a very satisfactory fill. Its disposal has, therefore, been a source of expense.

Another material that can be cheaply obtained and in excellent condition for use in my process is finely divided calcium carbonate.

In the manufacture of caustic soda, limestone is burned to lime and then suspended in water, after slaking, and treated with a solution of sodium carbonate, whereupon calcium carbonate is precipitated in a very finely divided form, leaving caustic soda in solution, which is concentrated for sale. This precipitated calcium carbonate is washed to free it from as much of the valuable caustic soda as possible and it is then pumped to waste.

This finely divided calcium carbonate resulting from the above process is usually termed calcium carbonate sludge, and if there be any appreciable amount of caustic soda present in the sludge this is of advantage because it reduces the amount of soda ash that needs to be added to carry on my process.

Typical analyses of the powdered coal ash and calcium carbonate sludge are given below.

| | Powdered coal ash per cent | $CaCO_3$ sludge per cent |
|---|---|---|
| 1. Silica | 46.9 | 2.43 |
| 2. Alumina | 29.3 | 1.94 |
| 3. Iron oxide | 11.7 | .15 |
| 4. Calcium oxide | 2.6 | 48.25 |
| 5. Magnesium oxide | .9 | 6.26 |
| 6. Carbon | 6.5 | |
| 7. Titanium oxide | 1.3 | |
| 8. Unclassified (difference) | .8 | .92 |
| 9. Carbon dioxide | | 40.05 |
| | 100.00 | 100.00 |

I have found that these two waste materials, each very finely divided in form, can be readily and very cheaply conveyed as a sludge, with water, by means of pumps and pipe lines or tank cars or tank trucks, to a plant where they can be readily handled and stored in tanks and then mixed in proper proportions with each other and with sodium carbonate to produce a sludge which can be charged into a rotary furnace and sintered.

I have found, however, that the powdered ashes from coal is variable in its aluminous content, due to the fact that the conditions under which the coal ash is burned are variable, the flame temperatures fluctuating. Also, different coals which are used as fuel are variable in composition with particular reference to the aluminous content. Consequently, the quantity and composition of the ash with particular reference to the aluminous content varies considerably.

In order to produce an efficient, standardized method of treating and furnacing this material it is essential to have the furnace charge of such composition that it will yield a uniform sinter and can be sintered with a substantially uniform furnace treatment and will yield a substantially uniform production of sodium aluminate. In order to accomplish this I have found it is desirable to add to the charge of aluminous material a proper proportion of bauxite to bring up the aluminous content to a standard predetermined amount, and this bauxite may be either silicious or ferruginous and may be readily ground and added to the sludge before furnacing.

Also it will be seen that in carrying out my invention it is desirable to form furnace charges of coal ashes and bauxite with such proportions of calcium carbonate and soda ash, especially with reference to the preferred aluminous content of the charges that substantially uniform furnace charges and sinters may be obtained.

If, for example, it is desired that the powdered coal ashes should have an aluminous content of 29.3%, which is the value in the typical example shown above, and the coal ashes available at the moment contained only 25% of alumina, a calculated amount of bauxite of any suitable or available composition would then be added to the powdered coal ashes so that the aluminous content of the mixture of coal ashes and bauxite would be 29.3%. Should the coal ashes run higher in aluminous content, other powdered coal ashes of lower aluminous content would be added to secure the desired 29.3% of alumina in the mixture.

With such a standard mixture having a substantially uniform content of aluminous material, the quantities of calcium carbonate and soda ash can be added in standard predetermined amounts to treat the material uniformly and obtain a substantially uniform yield of sodium aluminate.

The operations required to produce the sinter are similar to those used in the wet process of making Portland cement. It is only necessary to mix the powdered coal ash, the calcium carbonate sludge and the soda ash together intimately, without grinding, because these materials, as explained, are already in finely divided form. If the composition of the powdered coal ash is such that it is desirable to add bauxite, this can be ground and added to this sludge.

The powdered coal ash, together with the necessary predetermined amount of bauxite added thereto, is mixed with the calcium carbonate sludge and with the soda ash in the proportions, by weight, of one part of the aluminous material, consisting of powdered coal ash and bauxite of standard predetermined composition with respect to alumina, one and one-half to two parts of calcium carbonate sludge, and from one-half to one part of soda ash, all parts being based on the dry weights of the materials. This mixture may then be charged into a suitable furnace, such as a rotary furnace, and subjected to a sintering temperature in the neighborhood of 1300° C. Due to the fact that charges made as described above are of uniform composition with respect to the aluminous content, it is unnecessary to have special controls for each charge of material, and they can be furnaced and sintered in a similar manner to produce standard and uniform yields of sodium aluminate in the sintered product. It may also be noted that by the addition of bauxite to provide a standard charge the sintering temperature will be substantially uniform, and there is less danger of overburning or underburning the charge.

The proportions mentioned in the above paragraph apply to finely divided ashes from powdered coal or to ground coal ashes. It is obvious, of course, that if waste coal products such as coal mine stirippings and the like which have not been burned are used in the furnace charge, the carbonaceous matter in this material will readily be burned out in the furnacing operation, but in forming the furnace charge, the unburned carbon must be allowed for.

The sinter produced in the furnace may then be ground and leached with water or dilute alkali solution to dissolve the alkali aluminate from the insoluble residue material, and the alkali aluminate may be readily treated to form alumina by well known means such as the well known Bayer process or by precipitation with carbon dioxide. Also, the alkali may be regenerated by well known means.

I have obtained a yield of refined alumina by my process of as much as 85% of the total alumina in the charged material.

It will thus be seen that by my process I am able to secure a relatively large yield of alumina from the aluminous material in waste products, such as finely divided coal ashes, waste coal products and the like and to obtain such yield in an economical and efficient manner.

While, for purposes of illustration, the invention has been described particularly with respect to the extraction of alumina from ashes produced from the burning of powdered coal, it will be understood that this invention as defined in certain of the claims includes the treatment of powdered coal ashes whether such ashes are produced from the burning of powdered coal, or are obtained from ashes or clinkers produced in the burning of coal or coal products, which, subsequent to the burning thereof, have been reduced to a powder or a suitable size for forming furnace charges. If the ashes are in the form of clinkers or fused ashes which have been quenched in water, it is preferable to grind or otherwise reduce them to a fine condition for forming furnace charges in practicing the process.

It will also be noted in my process of obtaining alumina that when the powdered coal is burned so as to produce coal ashes in fine form as previously specified no grinding of the ashes is necessary, and if the calcium carbonate sludge as herein described be used no grinding of the sludge is necessary due to its inherent fine division.

It will also be seen that the efficiency of my process is increased in the furnacing operation due to the extremely fine division of the charge and that the handling and conveying and storing of the raw materials to form the charge is very economical.

It may also be noted that if it is not convenient to use calcium carbonate sludge, other forms of calcium compounds such as limestone may be used.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. The process of recovering alumina from powdered coal ash and the like which comprises forming a furnace charge of powdered coal ash with a calcium product and soda ash, sintering the mixture, and dissolving the resulting sodium aluminate from the sinter.

2. The process of recovering alumina from powdered coal ash and the like which comprises mixing the powdered coal ash with a finely divided calcium carbonate sludge and soda ash, sintering the mixture and extracting the resulting sodium aluminate from the sinter.

3. The process of recovering alumina from powdered coal ash and the like which comprises forming a mixture of the powdered coal ash, calcium carbonate and soda ash together with bauxite to raise the aluminous content of the charge to a standard value, sintering the mixture and extracting the sodium aluminate from the sintered material.

4. The process of recovering alumina from powdered coal ash and the like which comprises forming a furnace charge of the powdered coal ash, a calcium product, soda ash and an aluminous material consisting predominantly of aluminum oxide to increase the aluminous content of the charge to a standard value, sintering the mixture and extracting sodium aluminate from the sintered material.

5. The process of recovering alumina from waste coal products which comprises forming a furnace charge of such waste coal products, calcium carbonate sludge and soda ash, sintering the material and extracting sodium aluminate from the sintered material.

6. The process of recovering alumina from waste coal products which comprises forming a furnace charge of such coal products, calcium carbonate sludge and soda ash in the proportion of one part of the coal products, one and a half to two parts calcium carbonate sludge and one-half to one part of soda ash, sintering the mixture, grinding the sinter, and extracting the sodium aluminate from the sintered material.

7. The process of recovering alumina from powdered coal ash which comprises forming a furnace charge of the powdered coal ash, calcium carbonate and soda ash in the proportions of one part of coal ash, one and a half to two parts calcium carbonate and one-half to one part of soda ash, sintering the mixture, and extracting the sodium aluminate from the sintered material.

8. The process of recovering alumina from waste coal products which comprises forming a furnace charge of such coal products, calcium carbonate sludge and soda ash together with bauxite to raise the aluminous content of the charge to a standard value, sintering the mixture and extracting the sodium aluminate from the sintered material.

9. The process of recovering alumina from powdered coal ash which comprises forming a furnace charge of the powdered coal ash, calcium carbonate sludge, soda ash and bauxite in the proportion of one part of the powdered coal ash and bauxite together, one and a half to two parts calcium carbonate and one-half to one part of soda ash, sintering the mixture, and extracting the sodium aluminate from the sintered material.

In testimony whereof I affix my signature.

ALFRED W. SCHEIDT.